US012494981B2

(12) United States Patent
Kale et al.

(10) Patent No.: US 12,494,981 B2
(45) Date of Patent: Dec. 9, 2025

(54) METHOD FOR OPERATING UNITS OF A COMMUNICATION NETWORK

(71) Applicant: Robert Bosch GmbH, Stuttgart (DE)

(72) Inventors: Adwait Sanjay Kale, Ludwigsburg (DE); Markus Schreiter, Gundelsheim (DE); Michael Menzel, Ingersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 452 days.

(21) Appl. No.: 18/055,903

(22) Filed: Nov. 16, 2022

(65) Prior Publication Data

US 2023/0164051 A1 May 25, 2023

(30) Foreign Application Priority Data

Nov. 22, 2021 (DE) ...................... 10 2021 213 076.3

(51) Int. Cl.
*H04L 43/10* (2022.01)
*H04W 4/40* (2018.01)

(52) U.S. Cl.
CPC ............... *H04L 43/10* (2013.01); *H04W 4/40* (2018.02)

(58) Field of Classification Search
CPC .................................. H04L 43/10; H04W 4/40
See application file for complete search history.

(56) References Cited

U.S. PATENT DOCUMENTS

| 11,205,347 | B2* | 12/2021 | Stählin | ................... G01S 19/46 |
| 2006/0242535 | A1 | 10/2006 | Barthel et al. | |
| 2013/0054084 | A1 | 2/2013 | Kosugi | |
| 2018/0046539 | A1 | 2/2018 | Takehara | |
| 2019/0139408 | A1* | 5/2019 | Lellmann | .............. G08G 1/0141 |
| 2023/0072416 | A1* | 3/2023 | Moritomo | ................ G08G 1/04 |

* cited by examiner

*Primary Examiner* — Chandrahas B Patel
(74) *Attorney, Agent, or Firm* — NORTON ROSE FULBRIGHT US LLP

(57) ABSTRACT

A method for operating a receiving unit of a communication network to recognize an erroneous transfer of useful data. The method includes: temporally consecutively receiving a multitude of data packets sent using the sending unit, each of the data packets encompassing useful data including an adapted value of a variable; the adapted values having been ascertained using the sending unit of the communication network, based on a received value of the variable and an adaptation value ascertained using an adaptation rule; and the adaptation values for values of the variable which are temporally consecutively received using the sending unit being different; and recognizing an erroneous transfer of the adapted values of the variable encompassed by the useful data using the receiving unit when the values of the variable, encompassed by a predefined number of temporally consecutively received data packets, differ by less than a predefinable or predefined threshold value.

12 Claims, 3 Drawing Sheets

FIG. 2
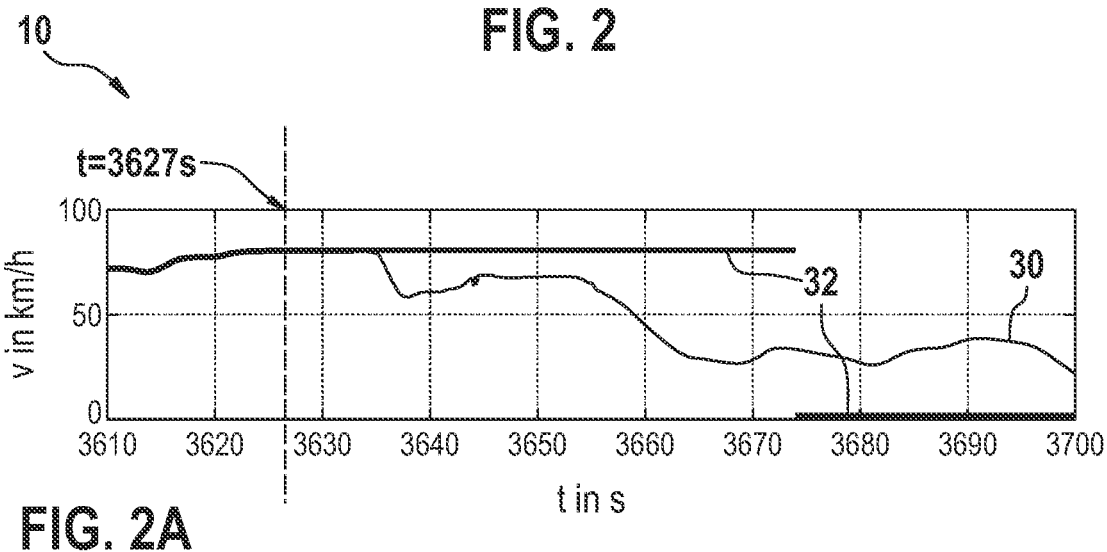
FIG. 2A
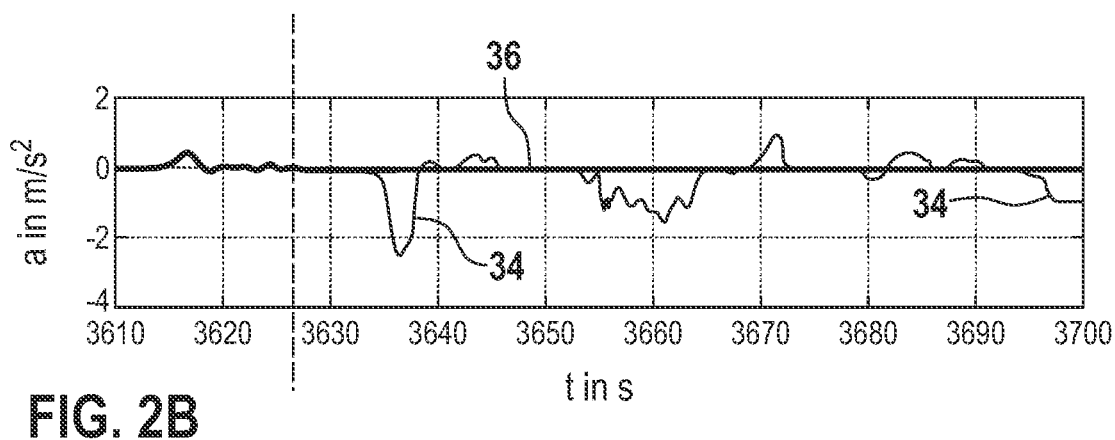
FIG. 2B
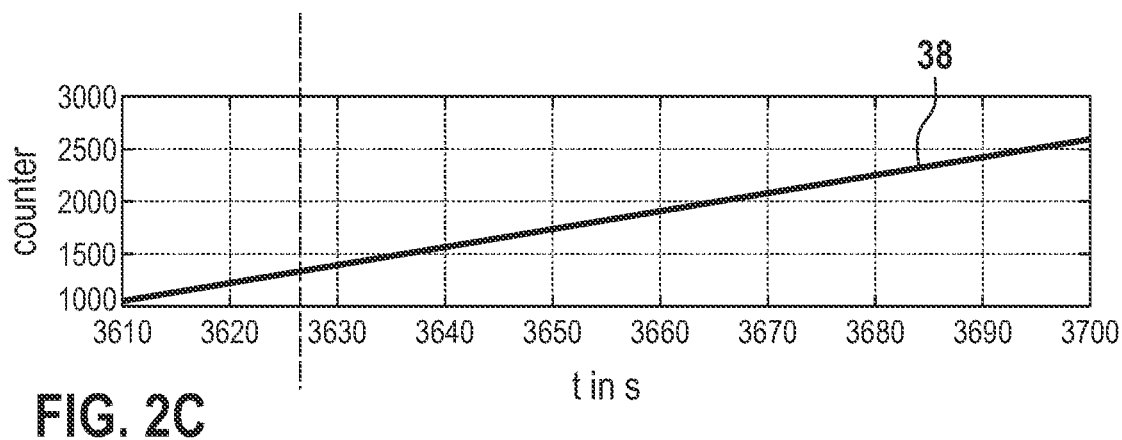
FIG. 2C

METHOD FOR OPERATING UNITS OF A COMMUNICATION NETWORK

CROSS REFERENCE

The present application claims the benefit under 35 U.S.C. § 119 of German Patent Application No. DE 10 2021 213 076.3 filed on Nov. 22, 2021, which is expressly incorporated herein by reference in its entirety.

FIELD

The present invention relates to a method for operating a sending unit of a communication network, to a corresponding method for operating a receiving unit of a communication network, to a method for operating a communication network, as well as to a method for operating a vehicle including a receiving unit. The present invention also relates to a sending unit, to a communication unit as well as to a communication network. The present invention furthermore relates to a computer program and to a machine-readable memory medium on which the computer program is stored.

BACKGROUND INFORMATION

Linked driving functions of today's vehicles, such as, for example, teleoperated driving, platooning or infrastructure-based driving functions, are based on pieces of information which are provided to the vehicles via communication interfaces by other vehicles or by the infrastructure. For these driving functions, a transfer of the pieces of information which is as uninterrupted and error-free as possible is required.

To recognize erroneous information transfers as early as possible, various methods for monitoring the transfer of messages via the communication interfaces are known, for example heartbeat methods.

SUMMARY

According to a first aspect, the present invention relates to a method for operating a sending unit of a communication network to recognize an erroneous transfer of useful data from the sending unit to a receiving unit of the communication network with the aid of the receiving unit.

According to an example embodiment of the present invention, the method includes a step of receiving at least one value of at least one variable of a multitude of values of the at least one variable, which are to be temporally consecutively received, with the aid of the sending unit. This means, in other words, that at least one value of at least one variable of multiple values of the at least one variable, which are to be provided temporally consecutively, is provided to the sending unit.

According to an example embodiment of the present invention, the method furthermore includes a step of ascertaining an adapted value of the variable based on the received value of the variable and an adaptation value, ascertained using an adaptation rule, with the aid of the sending unit. This means, in other words, that for each received value of the variable, a corresponding adapted value of the variable is ascertained or calculated in response to the reception of the value. In the process, the adaptation values for temporally consecutively received values of the variable are different.

According to an example embodiment of the present invention, the method furthermore includes a step of sending a data packet including the useful data, encompassing the ascertained adapted value of the variable, with the aid of the sending unit to the receiving unit. Preferably, a data packet for each ascertained adapted value of the variable is sent to the receiving unit, it being possible, in particular, for the data packet to include a further adapted value of a further variable.

According to a second aspect, the present invention relates to a method for operating a receiving unit of a communication network to recognize an erroneous transfer of useful data from a sending unit of the communication network to the receiving unit with the aid of the receiving unit.

According to an example embodiment of the present invention, the method includes a step of temporally consecutively receiving a multitude of data packets, sent with the aid of the sending unit, with the aid of the receiving unit. In the process, the data packets encompass useful data including a respective adapted value of a variable. In the process, the adapted values were also ascertained with the aid of the sending unit of the communication network, based on a received value of the variable and an adaptation value ascertained using an adaptation rule. In the process, furthermore the adaptation values for values of the variable temporally consecutively received with the aid of the sending unit are different. This means, in other words, that, in the step of receiving, a multitude of data packets, including an adapted value of the variable which has been ascertained according to the above-described method and sent with the aid of the sending unit according to the above-described method, are temporally consecutively received with the aid of the receiving unit.

According to an example embodiment of the present invention, the method also includes a step of recognizing an erroneous transfer of the adapted values of the variable, which are encompassed by the useful data, with the aid of the receiving unit when the adapted values of the variable, encompassed by a predefined or predefinable number of, for example two, three, five or ten, temporally consecutively received data packets differ by less than a predefinable or predefined threshold value, in particular when the adapted values of the variable encompassed by a predefined number of temporally consecutively received data packets are identical.

According to a third aspect of the present invention, the present invention relates to a method for operating a communication network, including a sending unit and a receiving unit, to recognize an erroneous transfer of useful data, from the sending unit to the receiving unit, with the aid of the receiving unit. The method includes operating the sending unit according to the method according to the first aspect of the present invention, and operating the receiving unit according to the method according to the second aspect of the present invention.

According to a fourth aspect of the present invention, the present invention relates to a method for operating a vehicle including a receiving unit in a communication network. The method includes operating the receiving unit of the vehicle according to the method according to the second aspect of the present invention to recognize an erroneous transfer of useful data, from a sending unit of the communication network to the receiving unit, with the aid of the receiving unit. The method furthermore includes controlling a unit of the vehicle in the event of a recognized erroneous transfer. The controlled unit of the vehicle may be the receiving unit or a further unit of the vehicle different from the receiving unit, for example a (central) control unit, an output unit, a drive unit, a braking unit and/or a steering unit.

According to a further aspect, the present invention relates to a sending unit, to a receiving unit, and to a communication network including the sending unit and the receiving unit.

According to a further aspect, the present invention relates to a computer program or a computer program product, as well as to a machine-readable memory medium, such as, for example, a semiconductor memory, a hard disk memory or an optical memory, including the computer program. The computer program may encompass two or multiple subprograms, which are executed on different computers or processing units, for example on the sending unit and the receiving unit.

Within the scope of the present invention, a communication network may be understood to mean a network including at least one first communication unit designed as a sending unit and a second communication unit designed as a receiving unit. The communication network is configured to provide a direct or indirect communication link, in particular, a wireless communication link, preferably a radio link between the communication units. The network may be configured to enable a direct communication or a direct exchange of data packets between the communication units terminals. The network may also include one or multiple base station(s) enabling a direct communication between the communication units via the one or multiple base station(s). The communication network is configured to enable, for example, a communication link according to the standard IEEE 802.11p, a near-field communication link or a mobile radio link, in particular, a 5G mobile radio link, between the communication units. The communication network preferably encompasses a network of vehicle-side communication units.

The sending unit and/or the receiving unit may be designed as a vehicle-side sending unit or receiving unit, in particular as a vehicle-side communication unit. The sending unit and/or the receiving unit may also be a user terminal or user equipment.

For example, the vehicle-side sending unit may be situated at a front vehicle, along a shared driving direction of two vehicles, and the receiving unit may be situated at a rear vehicle, along the shared driving direction. The two vehicles may be part of a group of vehicles or a platoon.

According to an example embodiment of the present invention, the sending unit preferably includes at least one processor, at least one memory including computer program code, at least one communication module, and at least one antenna, the computer program code being configured in such a way that it, with the aid of the at least one processor, the at least one communication module and the at least one antenna, causes the sending unit to carry out the steps according to the above-described method for operating the sending unit.

The receiving unit preferably includes at least one processor, at least one memory including computer program code, at least one communication module, and at least one antenna, the computer program code being configured in such a way that it, with the aid of the at least one processor, the at least one communication module and the at least one antenna, causes the receiving unit to carry out the steps according to the above-described method for operating the receiving unit.

The variable may be a physical or technical variable or a variable derived from a physical or technical variable. For example, the variable may represent a movement of the sending unit or of a mobile device including the sending unit, in particular, of a vehicle. It is possible that the variable is selected from velocity and/or acceleration. It is also possible that the variable represents a state of the sending unit or of the mobile device including the sending unit.

The value of the variable may be detected with the aid of a sensor unit, for example a velocity sensor or an acceleration sensor, and/or be provided to the sending unit. The value of the variable may be a value which is subject to dimensions or non-dimensional. It is possible that the value is a velocity value or an acceleration value. It is also possible that the value is, for example, a binary value of the state of the sending unit or of the mobile device.

In the case of a value of the variable which is subject to dimensions, the adapted value of the variable has the same dimension as the received value of the variable. The adapted value of the variable is preferably ascertained as a sum or difference between the received value and the adaptation value.

The adaptation value is ascertained using the adaptation rule or an adaptation algorithm. The adaptation rule is configured to assign an adaptation value to the received value of the variable. In the process, the adaptation value may be dependent on or independent of the received value of the variable, the adaptation values for temporally consecutively received values of the variable being different. It is possible that the adaptation value, relative to the received value of the variable, is smaller than or equal to a predefined or predefinable threshold value. It is also possible that a value range for the adaptation value, relative to the received value of the variable, is ascertained, in particular, as a percentage value, for example 1% or 2%, of the received value of the variable. It is furthermore possible that an adaptation value for a received value of a first variable is different from an adaptation value for a received value of a second variable. For example, the adaptation value for the variable 'velocity' may be smaller than or equal to 1 km/h. For example, the adaptation value for the variable 'acceleration' may be smaller than or equal to 0.5 m/s$^2$. Due to such a selection of the adaptation values, for example when transferring velocity and acceleration values of a first vehicle to a second vehicle following the first vehicle on a highway, no restrictions with respect to the operation of the second vehicle, based on the transferred velocity and acceleration values of the first vehicle, are to be expected.

The adaptation values for temporally consecutively received values of the variable may have a periodicity or be aperiodic. For example, the adaptation values may be randomly ascertained within a predefined or predefinable value range, with the proviso that the adaptation values for temporally consecutively received values of the variable are different.

The data packet preferably includes control data, in addition to the useful data. The data packet may be transferred, for example, from the sending unit to the receiving unit with the aid of modulation of a carrier signal. This means, in other words, that the adapted value of the variable encompassed by the useful data may additionally be transferred in modulated form, at least in sections, for the transfer on a communication line from the sending unit to the receiving unit.

Within the scope of the present invention, an erroneous transfer of useful data of a data packet may be understood to mean a transfer, in particular, via a radio interface, from the sending unit to the receiving unit during which a first value of the variable, encompassed by useful data of a first transferred data packet, is erroneously identical to a second value of the same variable, encompassed by useful data of a second data packet transferred temporally after the first data packet. In the process, the data packet or packets encompassing the respective useful data is or are transferred completely, however in a manner that is subject to errors with respect to the value of the variable. This means, in other words, during an erroneous transfer, a value of the variable is erroneously transferred which does not represent the value of the variable intended for the transfer, in particular, not the value of the variable received from the sending unit. In particular, in the process, the transferred value of the variable may be identical for multiple consecutively transferred data packets. The erroneous transfer of the erroneous transferring of the incorrect or wrong value of the variable may be caused by an error at the interface of the communication line between the sending unit and the receiving unit. For example, a "freezing" or "freeze" of the value of the variable may be present, so that temporally consecutively sent data packets erroneously encompass the identical value of the variable.

The recognition of the erroneous transfer preferably includes a step of ascertaining whether the adapted value of the variable encompassed by the useful data was erroneously transferred or represents, or does not represent, the value intended for the transfer.

In the event that no erroneous transfer was recognized, a value signal encompassing the received adapted value of the variable may be output with the aid of the receiving unit. As an alternative or in addition, the value signal may encompass a value ascertained with the aid of the receiving unit, based on the received adapted value of the variable, which is identical to the value of the variable received with the aid of the sending unit.

The method according to the present invention enables a reliable and robust recognition of an erroneous transfer of useful data in a communication network, in particular, in cases in which data packets are completely transferred from the sending unit to the receiving unit. With the aid of the method, it may be prevented that values of the same variable, which due to an erroneous transfer or a "freeze" are identical in consecutively transferred data packets, are interpreted by mistake as an error-free transfer or a correct system behavior. In this way, an earlier recognition of the erroneous transfer or of the "freeze" is possible, in particular, in the case of a variable for which identical values of the same variable in consecutive data packets represent a plausible scenario. A warning may be output and/or an intervention in the communication network and/or units directly or indirectly connected to the communication network may take place accordingly early. In the case of vehicle-side receiving and/or sending units, driving situations which are potentially critical due to the erroneous transfer may be recognized at an early stage, and the corresponding vehicle or vehicles may be transferred into a safe state in a timely manner.

According to an example embodiment of the present invention, it is advantageous when the adaptation value is ascertained, taking into consideration a piece of time information and/or a piece of counter information with respect to, in particular, a generation and/or sending unit-side reception of, the value of the variable. The piece of time information may encompass an indication of a point in time at which or during which the value of the variable was, for example, generated with the aid of a sensor unit and/or, for example, received with the aid of the sending unit. The piece of counter information may encompass an indication of, for example, a counter which is incremented during the generation and/or reception of a value of the variable. The respective piece of time information and/or the piece of counter information may be part of the sent or transferred or received data packet, in particular, of the useful data of the data packet. This embodiment allows the value of the variable received from the sending unit to be ascertained from the transferred adapted value with the aid of the receiving unit, so that the adaptation of the useful data used for error recognition may be reversed after the transfer and prior to a further use of the useful data.

It is also advantageous when the adaptation values for a multitude of temporally consecutively received values of the variable have a periodicity with respect to the piece of time information and/or the piece of counter information with respect to, in particular, the generation and/or reception of, the value of the variable. It is possible that the adaptation values for even values of the counter take on a predefined or predefinable constant value, and for odd values of the counter take on the same constant value having the reverse sign. It is also possible that the adaptation values are ascertained as function values of a trigonometric function having an argument encompassing the time and/or the counter. For example, adaptation values for the variable 'velocity' may be ascertained according to adaptation rule $\Delta v_i = v_0 * \sin(t_i/T)$. In the process, $v_0$ denotes a predefined temporally constant velocity value, T denotes a predefined periodicity constant, and $t_i$ denotes the piece of time information with respect to the generation or reception of velocity value $v_i$, for example a detection point in time of a detection of velocity value $v_i$ with the aid of a velocity sensor connected to the sending unit. As a result of this embodiment, a robust adaptation of the values of the variable to be transferred is possible, which allows the receiving unit to back-calculate the values received with the aid of the sending unit.

According to an example embodiment of the present invention, it is furthermore advantageous when the adapted value of the variable is moreover ascertained based on an ascertained adapted value of a value of the variable received at a temporally earlier stage with the aid of the sending unit, so that the adapted values for temporally consecutively received values of the variable are different. It is possible that values of the same variable consecutively received with the aid of the sending unit differ in such a way that the adapted values ascertained based on the received values are identical due to the differing adaptation values. The method for operating the sending unit is thus able to take the adapted value, ascertained for a value received at a temporally earlier stage, into consideration during the ascertainment of the adapted value. For example, adaptation values of consecutively received velocity values may alternately take on the value +1 km/h and −1 km/h, at a first velocity value of 79 km/h and a subsequently received second velocity value of 81 km/h, a first adaptation value +1 km/h and a second adaptation value −1.1 km/h being ascertained, so that the adapted velocity values take on the differing values 80 km/h and 79.9 km/h, instead of the identical values 80 km/h. This embodiment allows the robustness of the recognition of the erroneous transfer to be further enhanced.

According to an example embodiment of the present invention, it is advantageous when the method for operating the receiving unit includes a step of outputting an error signal with the aid of the receiving unit as a function of the recognized erroneous transfer. It is possible that the error signal is only output when an erroneous transfer was recognized. The error signal may encompass the adapted value of the variable which was transferred erroneously. In the case of a vehicle-side receiving unit or a receiving unit situated at a vehicle, the error signal may be output to a further unit of the vehicle, for example a (central) control unit and/or an output unit and/or a drive unit and/or a steering unit and/or a braking unit of the vehicle.

It is of advantage in the process when, in response to the error signal output with the aid of the receiving unit,
a message encompassing a piece of error information with respect to the recognized erroneous transfer is sent to the sending unit with the aid of the receiving unit and/or
a further unit of a mobile device encompassing the receiving unit is controlled.

The further unit of the mobile device, for example of a vehicle, may be a (central) control unit and/or an output unit and/or a drive unit and/or a steering unit and/or a braking unit of the vehicle, a velocity of the mobile device being changed, in particular reduced, and/or a steering angle being changed in the step of controlling the further unit. It is also possible that the further unit, instead of the value of the variable which was transferred in an erroneous manner, predicts a value of the variable, in particular based on the value of the variable which was transferred in an error-free manner. As a result of this embodiment, measures for eliminating the erroneous transfer may be taken or initiated on the side of the sending unit, and measures for preventing critical situations may be taken or initiated on the side of the receiving unit.

It is furthermore of advantage when the method for operating the receiving unit includes a step of ascertaining the respective value, received with the aid of the sending unit, based on the corresponding adapted value, received with the aid of the receiving unit, with the aid of the receiving unit, to output a value signal with respect to the ascertained value. In the process, the value signal is preferably output when no erroneous transfer was recognized. For this purpose, the receiving unit may be provided with a piece of information with respect to the adaptation rule used for ascertaining the adaptation value, for example once with the aid of the sending unit. It is also possible that the piece of information with respect to the adaptation rule is encompassed by one or multiple of the received data packet(s). Using the piece of information with respect to the adaptation rule, the value of the variable received with the aid of the sending unit may be back-calculated or restored, based on the value received with the aid of the receiving unit. Due to this embodiment the adaptation of the useful data used for error recognition may be reversed after the transfer and prior to a further use of the useful data, so that the method is also usable for values of the variable to be transferred with high accuracy.

BRIEF DESCRIPTION OF EXAMPLE EMBODIMENTS

The present invention is described in greater detail hereafter by way of example based on the figures.

FIGS. 2A, 2B, 2C show an erroneous transfer of useful data according to a conventional method.

DETAILED DESCRIPTION OF EXAMPLE EMBODIMENTS

Figure 1:
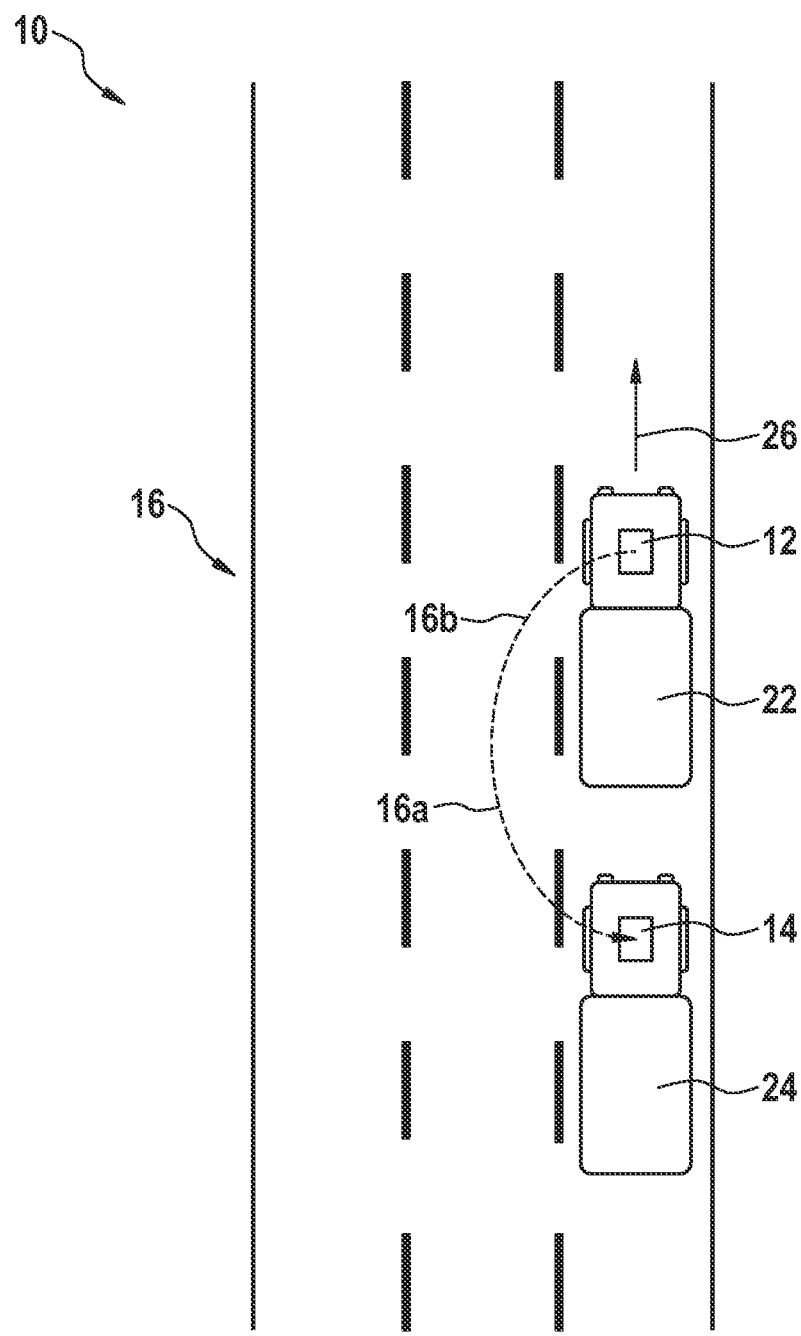
FIG. 1 shows a communication network including two linked vehicles.

FIG. 1 shows a communication network 10 including a first communication unit 12 and a second communication unit 14. First communication unit 12 is situated at a first vehicle 22. Second communication unit 14 is situated at a second vehicle 24. Vehicles 22, 24 are driving along a shared driving direction 26 one behind the other.

Communication units 12, 14 each include at least one processor unit and one memory medium. Furthermore, an antenna unit is assigned to each of communication units 12, 14, which may be part of communication units 12, 14 or, alternatively, is situated away from communication units 12, 14 at the respective vehicle 22, 24.

Communication units 12, 14 are designed as sending and receiving units 12, 14. This means, in other words, communication units 12, 14 are designed to transfer data packets 16, 16a, 16b with the aid of a wireless communication link to the respective other communication unit 12, 14. The wireless communication link may, for example, be a communication link according to the 4G, 5G or ITS-G5 standard.

According to a preferred embodiment of the present invention, second vehicle 24 is controlled based on useful data transferred from first vehicle 22 to second vehicle 24. In the process, the useful data of data packets 16, 16a, 16b encompass pieces of information with respect to velocity v, and preferably acceleration a, of first vehicle 22. Second communication unit 14 may be connected to a vehicle-side (central) control unit of second vehicle 24 for regulating the velocity of second vehicle 24.

FIGS. 2A-2C show, based on measured data, an erroneous transfer of useful data according to a conventional method from the related art, for example in a communication system 10 according to FIG. 1.

FIG. 2A shows a first temporal profile 30 of values of velocity v of first vehicle 22, which are provided, for example, by a velocity sensor of first vehicle 22. FIG. 2A furthermore shows a second temporal profile 32 of values of velocity v of first vehicle 22, which are received as part of useful data of a data packet 16, sent by first communication unit 12, with the aid of second communication unit 14.

Correspondingly, FIG. 2B shows a first temporal profile 34 of values of acceleration a of first vehicle 22, which are provided, for example, by an acceleration sensor of first vehicle 22. FIG. 2B furthermore shows a second temporal profile 36 of values of acceleration a of first vehicle 22, which are received as part of useful data of data packet 16, sent by first communication unit 12, with the aid of second communication unit 14.

FIG. 2C shows a temporal profile 38 of a sequence number of data packets 16 sent by first communication unit 12 and received by second communication unit 14.

In the process, the time axes in FIGS. 2A, B, C are identical.

On the one hand, it becomes apparent based on the sequence numbers, ascending over time, of data packets 16 received by second communication unit 14 according to FIG. 2C that data packets 16 sent by first communication unit 12 to second communication unit 14 are successfully received by second communication unit 14.

On the other hand, it becomes apparent based on FIG. 2A that first temporal profile 30 and second temporal profile 32 of velocity v deviate from one another starting at a point in time of approximately t=3635 s. Based on FIG. 2B, it becomes furthermore apparent that first temporal profile 34 and second temporal profile 36 of acceleration a also deviate from one another starting at a point in time of approximately t=3635 s. A more detailed analysis shows that the values of velocity v and of acceleration a received by second communication unit 14 are already constant over time starting at a point in time of t=3627 s.

This means, in other words, instead of the values of velocity v and of acceleration a received from first communication unit 12, starting at a point in time of t=3627 s erroneously always the same value of velocity v or of acceleration a is transferred from first communication unit 12 to second communication unit 14.

According to the present invention, a method is now provided, with the aid of which such an erroneous transfer of useful data from first communication unit 12 to second communication unit 14 may be recognized with the aid of second communication unit 14.

For this purpose, first communication unit 12 of first vehicle 22 is configured to receive at least one velocity value $v_1$ of a multitude of velocity values $v_1, v_2$ to be temporally consecutively received. Velocity values $v_1, v_2$ may, for example, be provided by a velocity sensor of first vehicle 22.

Preferably, first communication unit 12 is also configured to receive at least one acceleration value $a_1$ of a multitude of acceleration values $a_1, a_2$ to be temporally consecutively received. Acceleration values $a_1, a_2$ may, for example, be provided by an acceleration sensor of first vehicle 22.

First communication unit 12 of first vehicle 22 is furthermore configured to ascertain an adapted velocity value $\bar{v}_1$ based on received velocity value $v_1$ and an adaptation value $\Delta v_1$ ascertained using an adaptation rule f. In the process, adaptation values $\Delta v_1, \Delta v_2$ ascertained with the aid of adaptation rule f are different for temporally consecutively received velocity values $v_1, v_2$.

According to one specific embodiment, adapted velocity value $\bar{v}_i$ is sum $v_i + \Delta v_i$ of received velocity value $v_i$ and a periodic adaptation value $\Delta v_i$, adaptation value $\Delta v_i$ taking on a predefined value $\Delta v$ when a counter i with respect to the reception of velocity value $v_i$ is odd, and takes on predefined value $-\Delta v$ when counter i with respect to the reception of velocity value $v_i$ is even. Similarly, adapted acceleration values $\bar{a}_i$ may be ascertained.

According to one alternative specific embodiment, adapted velocity value $\bar{v}_i$ is sum $v_i + \Delta v_i$ of received velocity value $v_i$ and a periodic adaptation value $\Delta v_i$, adaptation value $\Delta v_i$ being ascertained, for example, with the aid of adaptation rule f as function value $v_0 * \sin(t_i/T)$. In the process, $v_0$ denotes a predefined temporally constant velocity value, T denotes a predefined periodicity constant, and $t_i$ denotes a piece of time information with respect to a generation of velocity value $v_i$, for example a detection point in time of a detection of velocity value v with the aid of velocity sensor of first vehicle 22.

Preferably, first communication unit 12 is also configured to ascertain an adapted acceleration value $\bar{a}_1$ based on received acceleration value $a_1$ and a further adaptation value $\Delta a_1$ ascertained using a further adaptation rule g. In the process, further adaptation values $\Delta a_1, \Delta a_2$ are different for temporally consecutively received acceleration values $a_1, a_2$.

First communication unit 12 of first vehicle 22 is furthermore configured to send a data packet 16 including the useful data, encompassing the ascertained adapted velocity value $\bar{v}_1$, to second communication unit 14 of second vehicle 24. Preferably, the useful data of data packet 16 also encompass the ascertained adapted acceleration value $\bar{a}_1$. Particularly preferably, the useful data of data packet 16 additionally encompass the respective counter i and/or the respective piece of time information $t_i$.

In particular, first communication unit 12 is configured to ascertain, for each received velocity value $v_i$ and each received acceleration value $a_i$, in each case an adapted velocity value $\bar{v}_i$ as described above or adapted acceleration value $\bar{a}_i$, as well as in each case to transfer an adapted velocity value $\bar{v}_i$, and an adapted acceleration value $\bar{a}_i$ as part of useful data of the same data packet 16 to second communication unit 14.

Second communication unit 14 of second vehicle 24 is configured to temporally consecutively receive a multitude of data packets 16a, 16b sent with the aid of first communication unit 12. In the process, a first data packet 16a encompasses the useful data including a first adapted velocity value $\bar{v}_1$ and preferably including a first adapted acceleration value $\bar{a}_1$. A second data packet 16b temporally following first data packet 16a encompasses useful data including a second adapted velocity value $\bar{v}_2$ and preferably including an adapted second acceleration value $\bar{a}_2$. Adapted velocity values $\bar{v}_1, \bar{v}_2$ and adapted acceleration values $\bar{a}_1, \bar{a}_2$ were, as shown above, ascertained with the aid of first communication unit 12, based on received velocity values $v_1, v_2$ or received acceleration values $a_1, a_2$ and corresponding adaptation value $\Delta v_1, \Delta v_2$ or $\Delta a_1, \Delta a_2$, ascertained using the respective adaptation rule f,g. In the process, adaptation values $\Delta v_1, \Delta v_2$ or $\Delta a_1, \Delta a_2$ for values $v_1, v_2$ or $a_1, a_2$ temporally consecutively received with the aid of first communication unit 12 are different.

Second communication unit 14 of second vehicle 24 is furthermore configured to recognize an erroneous transfer of adapted velocity values $\bar{v}_1, \bar{v}_2$ encompassed by the useful data when adapted velocity values $\bar{v}_1, \bar{v}_2$, encompassed by a predefined number of, for example two, temporally consecutively received data packets 16a, 16b, differ by less than a predefinable or predefined threshold value, preferably do not differ at all or are identical.

Preferably, second communication unit 14 is also configured to recognize an erroneous transfer of adapted acceleration values $\bar{a}_1, \bar{a}_2$ encompassed by the useful data when adapted acceleration values $\bar{a}_1, \bar{a}_2$, encompassed by a predefined number of, for example two, temporally consecutively received data packets 16a, 16b, differ by less than a predefinable or predefined threshold value, preferably do not differ at all or are identical.

In the event that an erroneous transfer was recognized with the aid of second communication unit 14, second communication unit 14 is, in particular, configured to output an error signal, preferably to the vehicle-side control unit of second vehicle 24, in order to transfer a brake signal to a braking unit of second vehicle 24, in response to the output error signal, with the aid of control unit of second vehicle 24 for increasing the distance from first vehicle 22.

In the event that no erroneous transfer was recognized with the aid of second communication unit 14, second communication unit 14, according to one preferred specific embodiment, is furthermore configured to ascertain the respective value $v_i, a_i$ received with the aid of first communication unit 12, for example from a velocity sensor and/or an acceleration sensor, based on the corresponding adapted value $\bar{v}_i, \bar{a}_i$ received with the aid of second communication unit 14, to output a value signal with respect to ascertained value $v_i, a_i$.

According to one specific embodiment, second communication unit 14 is configured in the process to ascertain the respective velocity value $v_i$, received with the aid of first communication unit 12, as a difference $\bar{v}_i - \Delta v_i$ from velocity value $\bar{v}_i$ received with the aid of second communication unit 14 and periodic adaptation value $\Delta v_i$, adaptation value $\Delta v_i$ taking on a predefined value $\Delta v$ when a counter i with respect to the reception of velocity value $v_i$ is odd, and taking on predefined value $-\Delta v$ when counter i with respect to the reception of velocity value $v_i$ is even. Second communication unit 14 is preferably configured to ascertain the respective acceleration value $a_i$ received with the aid of first communication unit 12 in an analogous manner.

According to an alternative specific embodiment, second communication unit 14 is configured in the process to ascertain the respective velocity value $v_i$, received with the aid of first communication unit 12, as a difference $v_i-\Delta v_i$ from received velocity value $v_i$ and periodic adaptation value $\Delta v_i$, adaptation value $\Delta v_i$ being ascertained, for example, with the aid of adaptation rule f as function value $v_0 * \sin(t_i/T)$. In the process, $v_0$ denotes the predefined temporally constant velocity value, T denotes the predefined periodicity constant, and $t_i$ denotes the piece of time information, encompassed by the received data packet 16, with respect to a generation of velocity value $v_i$.

Figure 3:
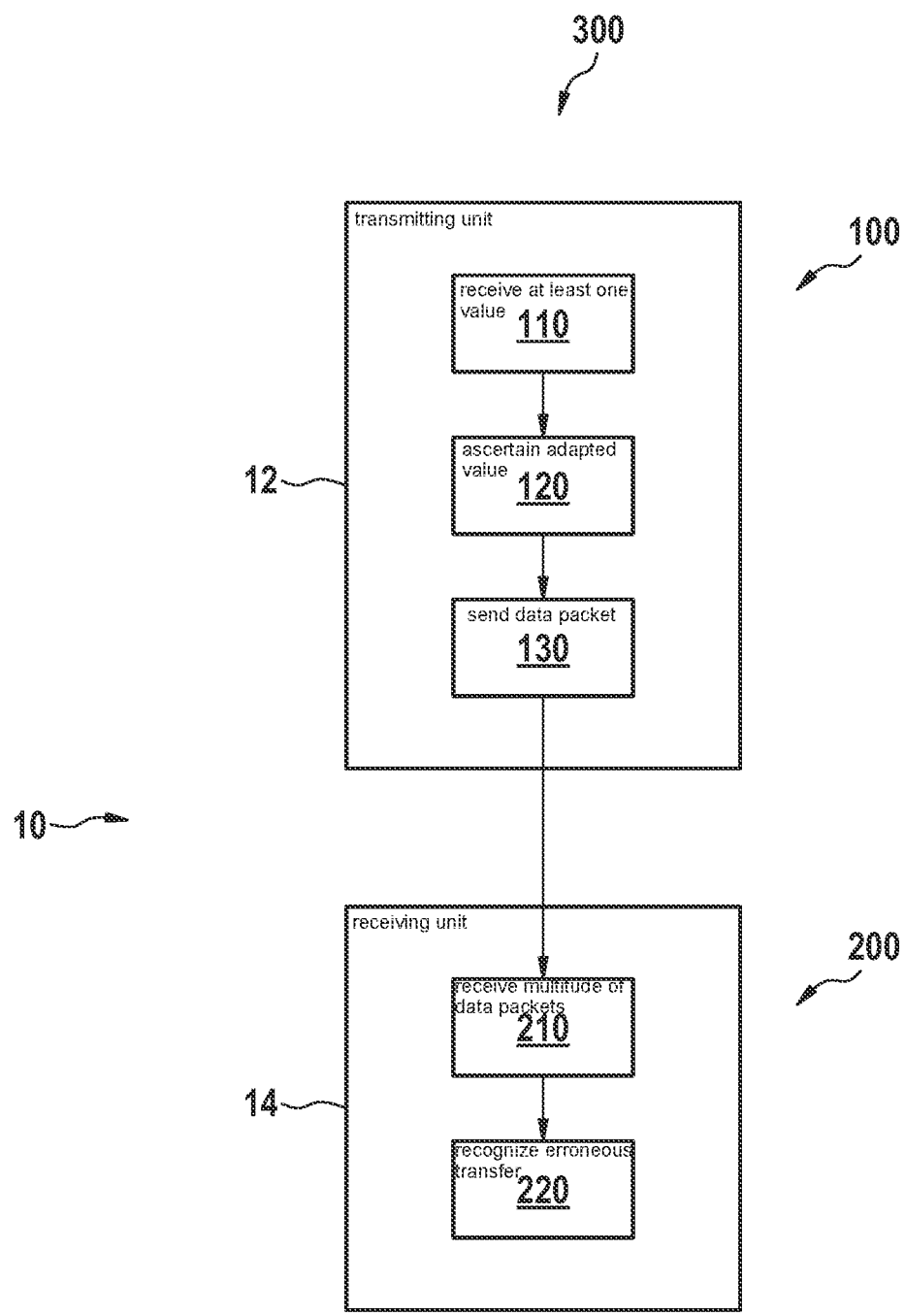
FIG. 3 shows a flowchart of a method for operating a communication network.

FIG. 3 shows a flowchart of a method for operating a communication network 10, including a sending unit 12 and a receiving unit 14, for recognizing an erroneous transfer of useful data, from sending unit 12 to receiving unit 14, with the aid of receiving unit 14. The method is denoted as a whole by reference numeral 300.

Communication network 10 may, for example, be communication network 10, sending unit 12 may be first communication unit 12, and receiving unit 14 may be second communication unit 14 according to FIG. 1.

Method 300 for operating the communication network includes steps of a method 100 for operating sending unit 12 of communication network 10 and steps of a method 200 for operating receiving unit 14 of communication network 10.

Method 100 for operating sending unit 12 includes a step 110 of receiving at least one value of a variable of a multitude of values of the variable to be temporally consecutively received, with the aid of the sending unit 12.

The method furthermore includes a step 120 of ascertaining an adapted value of the variable based on the received value of the variable and an adaptation value, ascertained using an adaptation rule, with the aid of sending unit 12, the adaptation values for temporally consecutively received values of the variable being different.

Method 100 furthermore includes a step 130 of sending a data packet including the useful data, encompassing the ascertained adapted value of the variable, with the aid of transmitting unit 12 to receiving unit 14.

Method 200 for operating receiving unit 14 includes a step 210 of temporally consecutively receiving a multitude of data packets sent with the aid of sending unit 12. In the process, the data packets encompass useful data including in each case an adapted value of the variable. The adapted values were ascertained in step 120 of method 100 with the aid of sending unit 12 of the communication network, based on the value of the variable received with the aid of sending unit 12 and the adaptation value ascertained using the adaptation rule. In the process, the adaptation values for values of the variable which are temporally consecutively received with the aid of sending unit 12 are different.

Furthermore, method 200 includes a step 220 of recognizing an erroneous transfer of the adapted values of the variable, which are encompassed by the useful data, with the aid of receiving unit 14 when the adapted values of the variable, encompassed by a predefined number of temporally consecutively received data packets, differ by less than a predefinable or predefined threshold value.

Method 300 may be carried out multiple times in succession, preferably periodically, for example during an operation of communication network 10, in particular while vehicles 22, 24 are driving.

What is claimed is:

1. A method for operating a sending unit of a communication network to recognize an erroneous transfer of useful data from the sending unit to a receiving unit of the communication network using the receiving unit, the method comprising the following steps:
   receiving at least one value of a variable of a multitude of values of the variable, to be temporally consecutively received, using the sending unit;
   ascertaining an adapted value of the variable based on the received value of the variable and an adaptation value, ascertained using an adaptation rule, using the sending unit, the adaptation values for temporally consecutively received values of the variable being different; and
   sending a data packet including the useful data, encompassing the ascertained adapted value of the variable, using the sending unit to the receiving unit,
   wherein the adapted value of the variable is ascertained based on an ascertained adapted value of a value of the variable which was received temporally before, so that the adapted values for temporally consecutively received values of the variable are different.

2. The method as recited in claim 1, wherein the adaptation value is ascertained, taking into consideration a piece of time information and/or a piece of counter information with respect to a generation and/or reception, of the received value of the variable.

3. A method for operating a sending unit of a communication network to recognize an erroneous transfer of useful data from the sending unit to a receiving unit of the communication network using the receiving unit, the method comprising the following steps:
   receiving at least one value of a variable of a multitude of values of the variable, to be temporally consecutively received, using the sending unit;
   ascertaining an adapted value of the variable based on the received value of the variable and an adaptation value, ascertained using an adaptation rule, using the sending unit, the adaptation values for temporally consecutively received values of the variable being different; and
   sending a data packet including the useful data, encompassing the ascertained adapted value of the variable, using the sending unit to the receiving unit,
   wherein the adaptation value is ascertained, taking into consideration a piece of time information and/or a piece of counter information with respect to a generation and/or reception, of the received value of the variable,
   wherein the adaptation values for a multitude of temporally consecutively received values of the variable have a periodicity with respect to the piece of time information and/or the piece of counter information with respect to the generation and/or reception, of the value of the variable.

4. A communication network, comprising:
   a sending unit configured to:
      receive at least one value of a variable of a multitude of values of the variable which are to be temporally consecutively received;
      ascertain an adapted value of the variable based on the received value of the variable and an adaptation value ascertained using an adaptation rule, adaptation values for temporally consecutively received values of the variable being different,
      wherein the adapted value of the variable is ascertained based on an ascertained adapted value of a value of the variable which was received temporally before, so that the adapted values for temporally consecutively received values of the variable are different; and send a data packet including the useful data encompassing the ascertained adapted value of the variable to the receiving unit; and a receiving unit configured to:

temporally consecutively receive a multitude of data packets sent using the sending unit, the data packets encompassing useful data including in each case an adapted value of a variable, the adapted values having been ascertained using a sending unit of the communication network, based on a received value of the variable and an adaptation value ascertained using an adaptation rule, and adaptation values for values of the variable which are temporally consecutively received using the sending unit being different, and recognize an erroneous transfer of the adapted values of the variable encompassed by the useful data when the adapted values of the variable, encompassed by a predefined number of temporally consecutively received data packets, differ by less than a predefinable or predefined threshold value.

5. A method for operating a receiving unit of a communication network to recognize an erroneous transfer of useful data, from a sending unit of the communication network to the receiving unit, using the receiving unit, the method comprising the following steps:

temporally consecutively receiving, using the receiving unit, a multitude of data packets, sent using the sending unit, the data packets encompassing useful data including in each case an adapted value of a variable, the adapted values having been ascertained using the sending unit of the communication network, based on a received value of the variable and an adaptation value ascertained using an adaptation rule, and the adaptation values for values of the variable which were temporally consecutively received using the sending unit being different;

recognizing an erroneous transfer of the adapted values of the variable, encompassed by the useful data, using the receiving unit, when the values of the variable encompassed by a predefined number of temporally consecutively received data packets differ by less than a predefinable or predefined threshold value; and ascertaining the respective value received using the sending unit, based on a corresponding adapted value received using the receiving unit, using the receiving unit to output a value signal with respect to the ascertained respective value.

6. The method as recited in claim 5, further comprising outputting an error signal using the receiving unit as a function of the recognized erroneous transfer.

7. A method for operating a receiving unit of a communication network to recognize an erroneous transfer of useful data, from a sending unit of the communication network to the receiving unit, using the receiving unit, the method comprising the following steps:

temporally consecutively receiving, using the receiving unit, a multitude of data packets, sent using the sending unit, the data packets encompassing useful data including in each case an adapted value of a variable, the adapted values having been ascertained using the sending unit of the communication network, based on a received value of the variable and an adaptation value ascertained using an adaptation rule, and the adaptation values for values of the variable which were temporally consecutively received using the sending unit being different;

recognizing an erroneous transfer of the adapted values of the variable, encompassed by the useful data, using the receiving unit, when the values of the variable encompassed by a predefined number of temporally consecutively received data packets differ by less than a predefinable or predefined threshold value; and outputting an error signal using the receiving unit as a function of the recognized erroneous transfer, wherein, in response to the error signal output using the receiving unit:

a message encompassing a piece of error information with respect to the recognized erroneous transfer is sent to the sending unit using the receiving unit, and/or a further unit of a mobile device including the receiving unit is controlled.

8. A non-transitory machine-readable memory medium on which is stored a computer program for operating a sending unit of a communication network to recognize an erroneous transfer of useful data from the sending unit to a receiving unit of the communication network using the receiving unit, the computer program, when executed by a computer, causing the computer to perform the following steps:

receiving at least one value of a variable of a multitude of values of the variable, to be temporally consecutively received, using the sending unit;

ascertaining an adapted value of the variable based on the received value of the variable and an adaptation value, ascertained using an adaptation rule, using the sending unit, the adaptation values for temporally consecutively received values of the variable being different; and sending a data packet including the useful data, encompassing the ascertained adapted value of the variable, using the sending unit to the receiving unit, wherein the adapted value of the variable is ascertained based on an ascertained adapted value of a value of the variable which was received temporally before, so that the adapted values for temporally consecutively received values of the variable are different.

9. A method for operating a communication network including a sending unit and a receiving unit, to recognize an erroneous transfer of useful data from the sending unit to the receiving unit using the receiving unit, the method comprising:

operating the sending unit including:

receiving at least one value of a variable of a multitude of values of the variable, to be temporally consecutively received, using the sending unit, ascertaining an adapted value of the variable based on the received value of the variable and an adaptation value, ascertained using an adaptation rule, using the sending unit, the adaptation values for temporally consecutively received values of the variable being different; and sending a data packet including the useful data, encompassing the ascertained adapted value of the variable, using the sending unit to the receiving unit, wherein the adapted value of the variable is ascertained based on an ascertained adapted value of a value of the variable which was received temporally before, so that the adapted values for temporally consecutively received values of the variable are different; and operating the receiving unit including:

temporally consecutively receiving, using the receiving unit, a multitude of data packets, sent using the sending unit, the data packets encompassing useful data including in each case an adapted value of a variable, the adapted values having been ascertained using the sending unit of the communication network, based on a received value of the variable and an adaptation value ascertained using an adaptation rule, and the adaptation values for values of the variable which were temporally consecutively received using the sending unit being different; and recognizing an erroneous transfer of the adapted values of the variable, encompassed by the useful data, using the receiving unit, when the values of the variable encompassed by a predefined number of temporally consecutively received data packets differ by less than a predefinable or predefined threshold value.

10. A method for operating a communication network including a sending unit and a receiving unit, to recognize an erroneous transfer of useful data from the sending unit to the receiving unit using the receiving unit, the method comprising:

operating the sending unit including:
receiving at least one value of a variable of a multitude of values of the variable, to be temporally consecutively received, using the sending unit,
ascertaining an adapted value of the variable based on the received value of the variable and an adaptation value, ascertained using an adaptation rule, using the sending unit, the adaptation values for temporally consecutively received values of the variable being different; and
sending a data packet including the useful data, encompassing the ascertained adapted value of the variable, using the sending unit to the receiving unit; and operating the receiving unit including:
temporally consecutively receiving, using the receiving unit, a multitude of data packets, sent using the sending unit, the data packets encompassing useful data including in each case an adapted value of a variable, the adapted values having been ascertained using the sending unit of the communication network, based on a received value of the variable and an adaptation value ascertained using an adaptation rule, and the adaptation values for values of the variable which were temporally consecutively received using the sending unit being different; and recognizing an erroneous transfer of the adapted values of the variable, encompassed by the useful data, using the receiving unit, when the values of the variable encompassed by a predefined number of temporally consecutively received data packets differ by less than a predefinable or predefined threshold value, wherein the receiving unit is in a vehicle.

11. A sending unit, configured to:
receive at least one value of a variable of a multitude of values of the variable which are to be temporally consecutively received;
ascertain an adapted value of the variable based on the received value of the variable and an adaptation value ascertained using an adaptation rule, adaptation values for temporally consecutively received values of the variable being different; and
send a data packet including the useful data encompassing the ascertained adapted value of the variable to the receiving unit,
wherein the adapted value of the variable is ascertained based on an ascertained adapted value of a value of the variable which was received temporally before, so that the adapted values for temporally consecutively received values of the variable are different.

12. A receiving unit, configured to:
temporally consecutively receive a multitude of data packets sent using a sending unit, the data packets encompassing useful data including in each case an adapted value of a variable, the adapted values having been ascertained using a sending unit of the communication network, based on a received value of the variable and an adaptation value ascertained using an adaptation rule, and adaptation values for values of the variable which are temporally consecutively received using the sending unit being different;
recognize an erroneous transfer of the adapted values of the variable encompassed by the useful data when the adapted values of the variable, encompassed by a predefined number of temporally consecutively received data packets, differ by less than a predefinable or predefined threshold value; and
ascertain the respective value received using the sending unit, based on a corresponding adapted value received using the receiving unit, using the receiving unit to output a value signal with respect to the ascertained respective value.

* * * * *